April 1, 1969   T. F. CANNING ETAL   3,436,344
PROCESS FOR REMOVING IMPURITIES FROM A FLUID STREAM
Filed Nov. 27, 1963
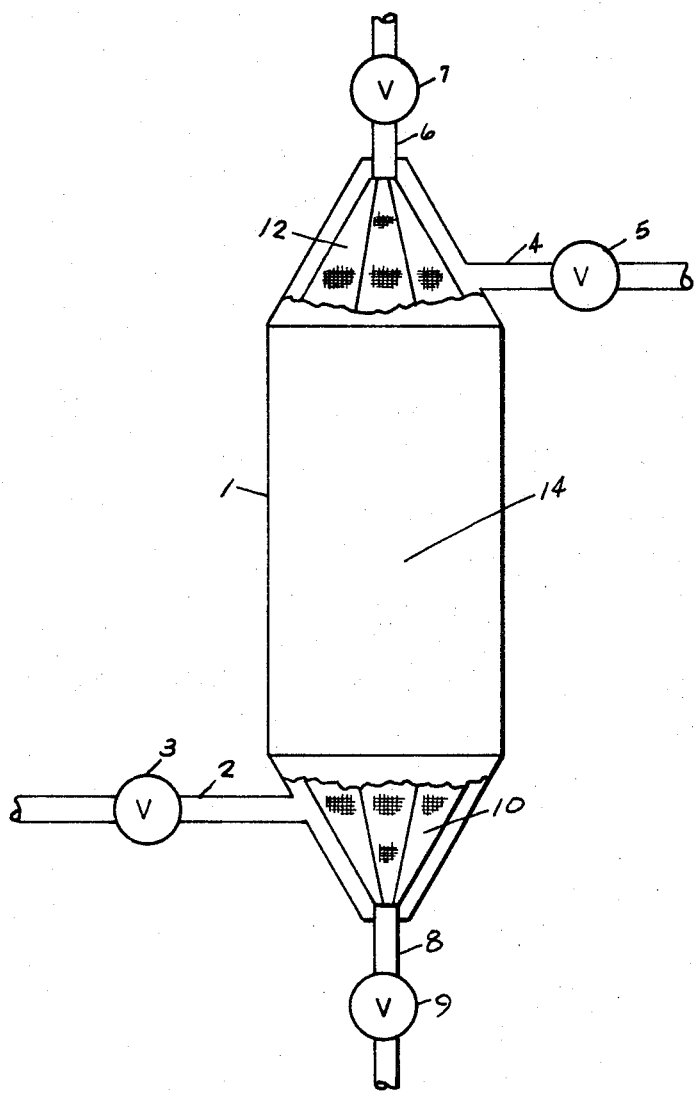
THOMAS F. CANNING
JOHN A. P. ROONEY
FRANK L. PHILLIPS
INVENTORS
BY
ATTORNEY United States Patent Office 3,436,344
Patented Apr. 1, 1969

3,436,344
PROCESS FOR REMOVING IMPURITIES FROM
A FLUID STREAM
Thomas F. Canning, John A. P. Rooney, and Frank L.
Phillips, Trona, Calif., assignors, by mesne assignments, to American Potash & Chemical Corporation,
a corporation of Delaware
Filed Nov. 27, 1963, Ser. No. 326,512
Int. Cl. B01d 15/06, 15/02
U.S. Cl. 210—39                                    3 Claims The present invention relates to the treatment of fluid streams. More particularly, the present invention relates to the removal of small amounts of impurities from fluid streams by contacting these streams with solid phase adsorbent.

Heretofore, considerable difficulty has been experienced in removing trace impurities from fluid streams. It has been proposed to contact fluid streams with solid adsorbents such as, for example, activated carbon to remove impurities from these streams. However, efficient use of the adsorbent generally has not been achieved.

It also has been proposed to pass the fluid to be purified through a bed of adsorbent to produce a purified effluent stream. Utilizing this procedure the first portion of the bed contacted with the stream of fluid rapidly becomes saturated with the adsorbate contaminant as adsorbtion proceeds. The concentration of the adsorbate material generally establishes itself in a wave front that moves through the bed from the point where the fluid first contacts the bed to the point where the effluent leaves the bed. As soon as this wave front has penetrated through the bed, it has been the practice to discontinue filtration since the adsorbate concentration in the effluent rises rapidly after this break through point. Filtration then has been disconnected even though a substantial portion of the adsorbent in the bed has not become completely saturated with adsorbate.

In an attempt to overcome these disadvantages, a number of beds have been connected in series whereby the effluent from the first bed became the feed solution to the second bed. Using plural beds in this manner, it has been possible in some instances to completely saturate the first bed and then discontinue flow to that bed while adding a fresh bed to the effluent side of the last bed. While such a procedure resulted in an efficient use of adsorbent, it necessarily required the use of multiple units.

The present invention provides a process whereby the foregoing disadvantages are obviated completely. According to the present invention, efficient utilization of adsorbent is achieved in a single unit. Furthermore, a high rate of fluid flow through the bed of adsorbent is achieved.

Broadly, the present invention includes a process for removing trace impurities from fluid streams wherein a confined bed of solid adsorbent is established and said contaminated fluid stream is passed there through. Absorbent is supplied to the bed in the vicinity of the region from which the effluent is withdrawn. Adsorbent is removed from the bed in the vicinity of the region where the contaminated fluid is supplied to the bed.

Preferably, the flow of fluid to the bed is discontinued during that period in which adsorbent solid is supplied to the bed and that period during which adsorbent which is completely loaded with adsorbate is withdrawn. Preferably, equal amounts of adsorbent are supplied to and withdrawn from the bed whereby the net quantity of adsorbent in the bed remains substantially the same.

The bed of adsorbent is confined in order that the adsorbent particles are not free to move with the stream of fluid. If the particles are free to move with the stream the bed becomes fluidized. Fluidization is undesirable because fluidized particles move and become distributed homogeneously throughout the entire bed. In a fluidized bed, particles which are completely saturated with adsorbate become uniformly interspersed with fresh adsorbent particles. As a result, the effluent generally contains a considerable amount of adsorbate unless the bulk of the adsorbent in the bed is fresh. To maintain the bulk of the adsorbent in a fresh state, it is necessary to withdraw and renew the adsorbent before it reaches saturation with respect to the adsorbate, thus reducing the efficiency of the process.

Fluidization can be prevented or minimized by supplying solid adsorbent to the bed in amounts sufficient to fully occupy the volume of the zone in which the bed is confined. Prevention of fluidization is further insured by introducing the fluid streams to the bed at a rate sufficient to at least partially compact the bed.

The process of this invention is applicable to the purification of both liquid and vapor streams. This process may be applied to fluid streams to decolorize, deodorize, or extract other undesirable contaminants therefrom. This process can generally be used anywhere that adsorbtive or ion-exchange techniques can be applied. It also can be applied to the recovery of valuable materials which are present in low concentrations in large bodies of fluids, as well as, to the removal of trace amounts of undesirable materials from large bodies of fluid. The present invention enjoys particular utility in the removal of trace organic contaminants from aqueous saline mixtures.

For a more complete understanding of the present invention, reference is made to the following description and to the accompanying drawing which comprises a schematic illustration of apparatus adapted to be used in practicing the present process.

Referring to the drawing, reference numeral 1 refers to a column having a fluid inlet conduit 2, and a fluid outlet conduit 4, an adsorbent inlet conduit 6, and an adsorbent outlet conduit 8. Conduits 2, 4, 6, and 8 contain, respectively, valves 3, 5, 7, and 9 which are adapted to provide control of the flow of materials through these conduits in a pre-determined manner. The interior 14, of column 1 is hollow and empty except for screens 10 and 12.

In carrying out the process of this invention, the interior 14 of column 1 is filled, through conduit 6, with particulate adsorbent. Flow of contaminated fluid to column 1 through conduit 2 is generally of sufficient rate to compact the solid adsorbent in interior 14 against screen 12. Interior 14 is completely filled with adsorbent and a stream of contaminated fluid is passed through this bed and out of column 1 through conduit 4 until a portion of the bed in the vicinity of screen 10 is completely saturated with the adsorbate contaminate. Then, valves 3 and 5 are closed, thus discontinuing the flow of contaminated fluid to column 1, and valve 9 is opened to expel the saturated portion of the bed from the vicinity of screen 10. Thereafter, valve 9 is closed and valve 7 is opened and to supply fresh adsorbent to column 1 through conduit 6. Adsorbent can be supplied and withdrawn simultaneously, or at separate times as desired. Preferably, the quantity of adsorbent withdrawn from, and the quantity supplied to column 1 are substantially equal in order that the net amount of adsorbent in column 1 remains the same and the column is full of adsorbent when passage of the fluid stream is again commenced. Following this procedure adsorbent passes in a semi-continuous manner, counter-current to the flow of the fluid stream, through the interior 14 of column 1 until it leaves the column completely saturated with adsorbate.

Advantageously, this procedure provides for very efficient utilization of adsorbent since it is completely saturated with adsorbate when it leaves the process. Furthermore, a very pure effluent fluid stream is produced.

Regeneration of the adsorbent which has been saturated with adsorbate by practice of the process can be accomplished by any conventional, known regenerative procedure such as, for example, steam, chemical or heat treatments. The manner in which the loaded adsorbent is regenerated is not critical. The adsorbent may be discarded, if desired, thus eliminating the expense of any regenerative procedure.

The nature of the adsorbent solid is not critical. Any of those activated carbons which are commercially available can generally be employed in this process. Likewise, fuller's earths, silica gels, activated clays, ion-exchange resins, bauxite, alumina and the like can be used as adsorbent solids in this process.

Generally, the particle size of the adsorbent can range from as small as 50 microns or even smaller, to as large as two inch diameter pellets or larger.

The fluid stream is generally supplied to the bed of adsorbent solid at a rate sufficient to at least partially compact the bed. It has been found that some compaction due to the force of the flow of the fluid through the bed is advantageous to insure that fluidization does not take place in the bed. In general, the flow rate of a liquid stream through the bed should be in excess of about 5 gallons per minute per square foot of bed cross-sectional area. The cross-section of the bed is taken normal to the flow of the fluid stream through the bed. Preferably, the rate of liquid flow is in excess of about 7 gallons per minute per square foot of bed cross-section. The maximum rate of liquid flow can be in excess of 30 gallons per minute per square foot or even more. Flow rates below 5 gallons per minute per square foot can be employed without risk of fluidization if the zone in which the bed is confined is substantially completely full of adsorbent solid, whereby the individual particles of adsorbent are not free to move under the action of the fluid stream.

Adsorbent solid is removed from and supplied to the established bed at any required frequency. Such flexibility of operation is highly advantageous, particularly in those instances in which the fluid to be treated contains an adsorbate which exhibits unusual adsorbate wave characteristics. Normally, an adsorbate will saturate that portion of the adsorbent solid which is first contacted by the contaminated fluid stream. The front of the zone of saturated adsorbent solid generally moves through the bed at a uniform rate in the direction of the fluid flow. However, an adsorbate occasionally is encountered which does not move at uniform rate through the bed, but rather accelerates in its movement through the bed. When this type of adsorbate is encountered, it may be necessary to remove saturated solid adsorbent from the bed frequency in order to prevent the adsorbate wave from accelerating and passing completely through the bed.

According to the present process, even when such unusual adsorbate wave characteristics are encountered and frequent solid adsorbent removal is required, only completely saturated adsorbent is removed from the bed. This process achieves, even under the most difficult adsorption conditions, substantially 100 percent efficiency in the utilization of solid adsorbent and high flow rates.

The depth of the solid adsorbent bed can be adjusted to any predetermined value and efficient operation achieved simply by regulating the frequency with which solid adsorbent is withdrawn and introduced to the bed.

In the specification, appended claims and following example, all parts and percentages are by weight unless otherwise indicated. The following example is submitted only to illustrate, not limit the invention.

EXAMPLE

This example is illustrative of the process of the present invention employed to remove trace organics from an aqueous saline solution using a carbon column of the type illustrated in the drawing.

A carbon bed is established in the form of a cylinder having a depth of 9 feet and a 23 square foot cross-sectional area normal to the longitudinal axis of the bed. The bed of carbon is confined in this column between two screens. The bed is composed of activated carbon having an average particle size of about 20 mesh (Tyler). The bed is positioned in a cylindrical column 1 having a carbon inlet conduit 6 at the top of the column and a carbon outlet conduit 8 at its bottom. A fluid inlet conduit 2 for the liquid stream is positioned in the bottom of the column adjacent to the carbon outlet conduit, and a fluid outlet conduit 4, by which the treated effluent leaves the column, is positioned at the top adjacent to the carbon inlet conduit.

The feed solution treated in this carbon column is a dilute aqueous solution of boric acid, potassium sulphate, sodium sulphate and sodium chloride containing about 12 parts per million of organic material of undefined specific composition. The organic material is present in the feed as a solute, as entrained liquid, and as solid matter. The feed solution is passed through the carbon bed at a constant flow rate of about 13.5 gallons per minute per square foot of column cross-sectional area. Feed solution is supplied to the carbon column at this rate for a period of 24 hours. Throughout this period of time, the effluent stream leaving the fluid outlet conduit contains less than 1 part per million of organic material. The flow of solution is stopped and the carbon bed is examined. It is found that the lower 2.5 feet of bed adjacent to the fluid inlet conduit are saturated with adsorbate.

The saturated carbon is removed from the carbon column by opening valve 9 in the carbon outlet conduit and applying water pressure to the top of the carbon bed to expel the carbon. The quantity of saturated carbon removed from the column is noted and an equal quantity of carbon is supplied to the column through the carbon inlet conduit 6 in the form of an aqueous slurry. The water contained in this slurry is conducted away from the top of the carbon column through the fluid outlet conduit 4 and discarded. The water contained in this slurry does not pass through the bed. When a quantity of fresh carbon equal to that removed from the column has been added to the top of the column, the carbon inlet conduit is closed and the carbon column again is ready for use.

This process can be applied to reduce the impurities content of fluid streams to substantially undetectable levels in a wide variety of fluids. For example, liquid and gaseous petroleum products can be discolored, deodorized or dried; water, industrial chemicals, sugar, dry-cleaning fluids, animal and vegetable oils can be decolorized and deodorized and air and other gases can be dehydrated by this process. In general, this process is applied to those fluids wherein the contaminant or contaminates to be removed as an adsorbate are present in total amounts of less than about 1 percent by weight of the fluid. If larger amounts of contaminate are present initially in the fluid, generally, conventional filtration procedures or other known separation procedures can be applied to reduce the contaminate concentration to about 1 percent by weight or less.

As will be understood by those skilled in the art, what has been described is the preferred embodiment of the invention; however, many modifications, changes and substitutions can be made therein without departing from the scope and the spirit of the following claims.

What is claimed is:

1. In a process for removing impurities from a fluid stream by passing said stream upwardly through an elongated column which is substantially completely filled with a bed of carbon, the improved method of replacing contaminated carbon in said bed which comprises the steps of:
   (a) interrupting the flow of said fluid stream through said bed,
   (b) washing contaminated carbon from the bottom of said bed by applying water pressure to the top of said bed, thereafter
   (c) introducing a water slurry of fresh carbon into the top of said bed in a quantity sufficient to substantially refill said column,
   (d) removing the water introduced with said slurry from the top of said bed and
   (e) resuming the passage of the fluid stream through said bed.

2. In a process for removing impurities from a fluid stream by passing said stream through an adsorbent zone which is substantially completely filled with adsorbent solids and which has a first side and a second side, the improved method of replacing contaminated solids in said zone which comprises the steps of:
   (a) interrupting the flow of said fluid stream through said zone,
   (b) washing contaminated solids from said first side of said zone by applying water pressure to said second side, thereafter
   (c) introducing a water slurry of fresh adsorbent solids into said second side of said zone in a quantity sufficient to substantially refill said zone,
   (d) removing the water introduced with said slurry from said second side and
   (e) resuming the passage of the fluid stream through said zone.

3. A process as set forth in claim 2 in which said adsorbent solids are selected from the group consisting of activated carbon, fuller's earth, silica gel, activated clay, ion-exchange resins, bauxite and alumina.

References Cited

UNITED STATES PATENTS

| 2,954,305 | 9/1960 | Grosvenor | 127—55 |
| 2,973,319 | 2/1961 | Porter | 210—33 |
| 3,200,067 | 8/1965 | Levendusky | 210—33 |

FOREIGN PATENTS

| 2,189 | 6/1875 | Great Britain. |
| 861,794 | 11/1940 | France. |

MORRIS O. WOLK, *Primary Examiner.*

SIDNEY MARANTZ, *Assistant Examiner.*

U.S. Cl. X.R.

127—9, 46, 55; 210—24